United States Patent
Da Silva

(10) Patent No.: US 10,234,878 B2
(45) Date of Patent: Mar. 19, 2019

(54) THERMOSTATIC DEVICE FOR CONTROLLING THE CIRCULATION OF A FLUID, AND THERMOSTATIC VALVE INCLUDING SUCH A DEVICE

(71) Applicant: VERNET, Ollainville (FR)

(72) Inventor: William Da Silva, Saint Germain les Arpajon (FR)

(73) Assignee: VERNET, Ollainville (FR)

( * ) Notice: Subject to any disclaimer, the term of this patent is extended or adjusted under 35 U.S.C. 154(b) by 0 days.

(21) Appl. No.: 15/567,848

(22) PCT Filed: Apr. 20, 2016

(86) PCT No.: PCT/EP2016/058713
§ 371 (c)(1),
(2) Date: Oct. 19, 2017

(87) PCT Pub. No.: WO2016/169958
PCT Pub. Date: Oct. 27, 2016

(65) Prior Publication Data
US 2018/0052476 A1 Feb. 22, 2018

(30) Foreign Application Priority Data
Apr. 21, 2015 (FR) ...................................... 15 53552

(51) Int. Cl.
*G05D 23/02* (2006.01)
(52) U.S. Cl.
CPC ................. *G05D 23/022* (2013.01)
(58) Field of Classification Search
CPC ..... G05D 23/02; G05D 23/021; G05D 23/022
(Continued)

(56) References Cited

U.S. PATENT DOCUMENTS 4,691,861 A * 9/1987 Sliger ................ G05D 23/1333
236/34.5
2010/0132361 A1 6/2010 Bouloy et al.
2015/0041552 A1 2/2015 Maraux

FOREIGN PATENT DOCUMENTS

DE 202010017837 U1 11/2012
FR 2919704 A1 2/2009
(Continued)

OTHER PUBLICATIONS

International Search Report dated Jul. 29, 2016 during the prosecution of International Application No. PCT/EP2016/058713.

*Primary Examiner* — Marc E Norman
(74) *Attorney, Agent, or Firm* — Troutman Sanders LLP

(57) ABSTRACT

A thermostatic device including a thermostatic element and a stopper, axially movable about a stationary seat of a housing, opening and closing a passage circulating fluid and connected to a movable portion of the thermostatic element. During expansion of a thermoexpansible material of the thermostatic element, the movable portion drives the stopper axially relative to the seat. The stopper includes a seal, resting tightly against the seal when the fluid circulation passage is closed by the stopper, a first part, with an inner bore receiving the movable portion, and a second part, separate from the first part, the seal being axially charged between the first and second parts. The first and second parts are made of metal, the second part is mounted around the first part, the part facing the axis of the second part forms a peripheral edge attaching said second part to the outer surface of the first part, and the first part forms an axial abutment for the edge of the second part, positioning the first and second parts axially relative to one another by applying a predetermined clamping load to the seal.

13 Claims, 4 Drawing Sheets

(58) Field of Classification Search
USPC .................................. 236/93 R, 99 J, 100
See application file for complete search history.

(56) References Cited

FOREIGN PATENT DOCUMENTS

| | | |
|---|---|---|
| FR | 2961917 A1 | 12/2011 |
| FR | 2987095 A1 | 8/2013 |
| WO | 2010012950 A1 | 2/2010 |

\* cited by examiner

THERMOSTATIC DEVICE FOR CONTROLLING THE CIRCULATION OF A FLUID, AND THERMOSTATIC VALVE INCLUDING SUCH A DEVICE

CROSS-REFERENCE TO RELATED APPLICATIONS

This is a U.S. national phase application under 35 U.S.C. § 371 of International Patent Application No. PCT/EP2016/058713, filed Apr. 20, 2016, and claims benefit of priority to French Patent Application No. 1553552, Apr. 21, 2015. The entire contents of these applications are hereby incorporated by reference.

TECHNICAL FIELD

The present invention relates to a thermostatic device, as well as a thermostatic valve comprising such a device.

The invention in particular relates to the thermostatic devices and valves that are used in cooling circuits of heat engines, in particular those of motor vehicles, heavy trucks, two-wheeled vehicles and stationary engines. That being said, this scope of application does not limit the invention, inasmuch as the device and the valve according to the invention can be used in various other fluid circuits, for example gearbox cooling circuits, water circuits, oil circuits, etc.

BACKGROUND

Within such a fluid circuit, such a thermostatic valve is used to regulate the flow of a fluid, i.e., to distribute this fluid in different pathways of the circuit, based on the temperature of this fluid. These valves are said to be thermostatic inasmuch as the movement of their inner seal relative to a seat associated with the housing of the valve is controlled by a thermostatic element, i.e., an element that comprises a body, containing a thermodilatable material, and a piston, submerged in this thermodilatable material, the body and the piston being movable relative to one another in translation along the longitudinal axis of the piston, while either the body or the piston is, during use, fixedly connected to the housing of the valve. FR-A-2,961,917, FR-A-2,919,704, FR-A-2,987,095 and WO-A-2010/012950 provide examples of such thermostatic valves.

This being recalled, it is known to authorize a slight flow of the fluid, typically described as an leak, through the stopper, in particular when the latter is in contact with the seat of the housing and closes the corresponding fluid flow passage. In this way, even when the stopper is in the closed position, a small quantity of fluid continues to flow through the stopper, which prevents arriving at an excessively high pressure differential on either side of the stopper, which could disrupt the operation of the valve, for example by causing pressure surges when the stopper is commanded to move away from the closed position. Of course, this controlled leak must remain low to maintain the expected regulation. In practice, various leak solutions, integrated into the stoppers of the existing thermostatic valves, are widespread and proven.

More recently, DE-U-20 2010 017 837 proposed integrating a leak of this type into a stopper made in a single piece of plastic. While the piston of the thermostatic element is fixedly connected to the valve housing, the body of this thermostatic element is received inside the stopper, by arranging, between the latter and the body of the thermostatic element, three separate passages for the free flow of the fluid, which occupy three separate angular portions around the body of the thermostatic element. The leak is thus channeled along the body of the thermostatic element, while being distributed into three streams locally sweeping the body of the thermostatic element. However, this solution proves restrictive and costly to implement, since it has a limited mechanical strength, in particular over the long term, and has a frozen design inasmuch as any change to the outer diameter of the stopper and/or the size of the thermostatic element requires completely resizing the stopper.

SUMMARY

The aim of the present invention is to propose an improved thermostatic device, in which the integration of a leak at the stopper is at once cost-effective, high-performing and reliable.

To that end, the invention relates to a thermostatic device for regulating the flow of a fluid, including a thermostatic element, which defines an axis and which includes both a piston, extending along the axis and intended to be fixedly connected to a housing channeling the fluid, and a body, substantially centered on the axis and containing a thermodilatable material in which the piston is submerged, such that the piston and the body are movable relative to one another along the axis, moving away from one another under the action of an expansion of the thermodilatable material, and a stopper, which is axially movable relative to a fixed seat of the housing so as to open and close a fluid flow passage and which is connected to the body of the thermostatic element such that, during the expansion of the thermodilatable material, the body of the thermostatic element drives the stopper axially relative to the fixed seat, wherein the stopper comprises, as two separate parts:

an insert for receiving the body of the thermostatic element, which is provided with a leak arrangement, suitable, irrespective of the axial position of the stopper relative to the housing, for allowing the fluid to flow freely between the body of the thermostatic element and the inner face of the insert and to traverse the insert to reach the outer face thereof, and a sleeve for outwardly jacketing the body of the thermostatic element, which is fixedly attached to the insert while surrounding, at a distance, the entire periphery of the body of the thermostatic element so as to radially delimit, between this body of the thermostatic element and the sleeve, a free space for the flow of the fluid passing through the leak arrangement.

One of the ideas at the base of the invention is that the stopper of the thermostatic device combines at least two separate pieces, namely an insert and a sleeve. The insert is designed so as inwardly to receive the body of the thermostatic element, and thus, during use, to be connected to the latter. This insert incorporates a leak for the fluid to be regulated by the thermostatic device: irrespective of the position of the stopper, in particular even when the stopper is positioned relative to a fixed seat of the housing so as to close the flow of the fluid between the stopper and this seat, fluid is free to flow through the stopper and between the body of the stopper and the inner face of this insert. One of the interests of this leak is, as indicated in the introductory part of this document, to avoid the appearance of an excessive pressure differential on either side of the stopper in the closed position. The sleeve in turn is designed to jacket the outside of the body of the thermostatic element, by surrounding it at a distance over its entire periphery: the fluid passing through the leak arranged at the insert then flows in a free space, typically annular, radially defined between the outer face of the body of the thermostatic element and the inner face of the sleeve. Since this free volume runs all the way around the body of the thermostatic element, the entire outer face of this body is swept by the fluid from the leak traversing the stopper in the closed position, such that even when this leak is dimensioned with a small value, the body of the thermostatic element is effectively thermally stressed by the fluid from the leak. Thus, one of the other interests of the leak is that the thermal stress of the body of the thermostatic element by this leak makes it possible to pre-sensitize this body inasmuch as, even when the stopper is in the closed position, the body of the thermostatic element is kept by the leak at the temperature of the fluid from this leak, this temperature typically being higher than that at which the body of the thermostatic element would be left in the total absence of fluid. It will in particular be understood that when a sudden stream of fluid significantly hotter than that of the leak through the closed stopper arrives directly on the body of the thermostatic element, via a pathway other than that closed by the stopper, the temperature increase of the body of the thermostatic element is gentler than if the body had not been pre-sensitized: the stopper then opens more gradually, avoiding flow rate surges in the circuit in which the thermostatic device according to the invention is integrated.

Furthermore, according to the invention, the sleeve jacketing the body of the thermostatic element is fixedly attached to the insert for receiving this body, this fastening being able to be done simply, robustly and cost-effectively. The thermostatic device according to the invention thus proves easy to adapt to various assembly environments, both at various cooperation interfaces with its stopper, subject to adaptation of the outer diameter of the insert and/or the sleeve, and to various sizes of its thermostatic element, subject to adaptation of the inner diameter of the insert and/or the sleeve. Furthermore, the insert in the sleeve of the stopper, if applicable completed by an additional seal, can be assembled to one another independently from the rest of the thermostatic device, which amounts to saying that the stopper can be provided in the form of a preassembled subassembly, thus facilitating the manufacture and further improving the adaptability of the thermostatic device according to the invention. Advantageous practical aspects of the implementation of the invention are also given later, in the subsequent description.

According to additional advantageous features of the thermostatic device according to the invention:
The insert and the sleeve are made from metal;
The insert is made by bending and/or stamping a sheet;
The sleeve is made by stamping a sheet or a tubular profile;
The insert includes a crown for axially bearing the body of the thermostatic element, and the leak arrangement comprises both at least one through hole of said crown, provided to allow the fluid to flow freely through the crown, and at least one relief of said crown, provided to axially raise the body of the thermostatic element;
The at least one relief of the crown of the insert is made in the form of a boss;
The insert further includes, on the inner periphery of its crown, a ring radially adjusted to the body of the thermostatic element, and wherein the at least one through hole of said crown is made in the form of a notch from said ring;
The sleeve is provided, at one of axial ends of the sleeve, with a peripheral rim to fasten the sleeve to an outer face of the insert;
The peripheral rim of the sleeve is fitted gripped around the insert;
The stopper further comprises a seal, which is suitable for being pressed sealably against the fixed seat when the fluid flow passage is closed by the stopper and which is axially gripped between the insert and the sleeve;
The seal is globally washer-shaped, being centered on the axis, and inwardly receives the peripheral rim of the sleeve;
The thermostatic device further comprises a compression spring, which, during a contraction of the thermodilatable material of the thermostatic element, returns the piston into the body of the thermostatic element and axially drives the stopper axially relative to the fixed seat, said compression spring including two opposite ends, whereof the first end is pressed axially against the sleeve of the stopper, while the second end of this compression spring is intended to be pressed axially against the housing.

The invention also relates to a thermostatic valve, including a housing, as well as a thermostatic device, which is as defined above and the piston of the thermostatic element of which is fixedly connected to the housing.

BRIEF DESCRIPTION OF THE DRAWINGS

The invention will be better understood upon reading the following description, provided solely as an example and done in reference to the drawings, in which.

DETAILED DESCRIPTION

FIGS. 1 to 6 show a valve 1 comprising a thermostatic device 2 for regulating the flow of a fluid. This fluid is typically a coolant or a heat transfer fluid. For example, the valve 1 belongs to a secondary circuit of a cooling assembly of a heat engine, in particular a motor vehicle engine, this example not being limiting, however, as mentioned in the introductory part of this document.

Figure 1:
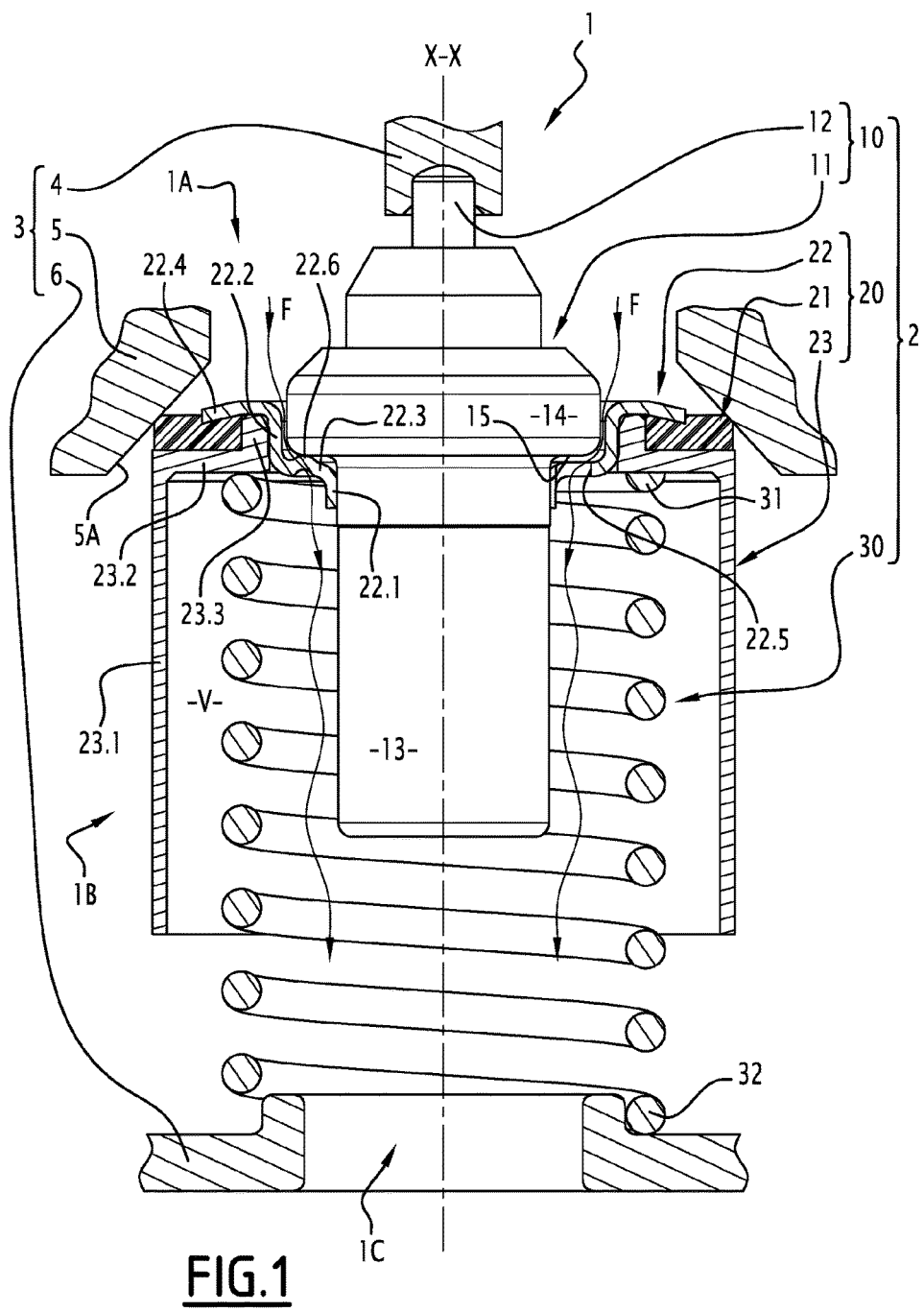
FIG. 1 is a longitudinal sectional view of a thermostatic valve according to the invention.
Figure 2:
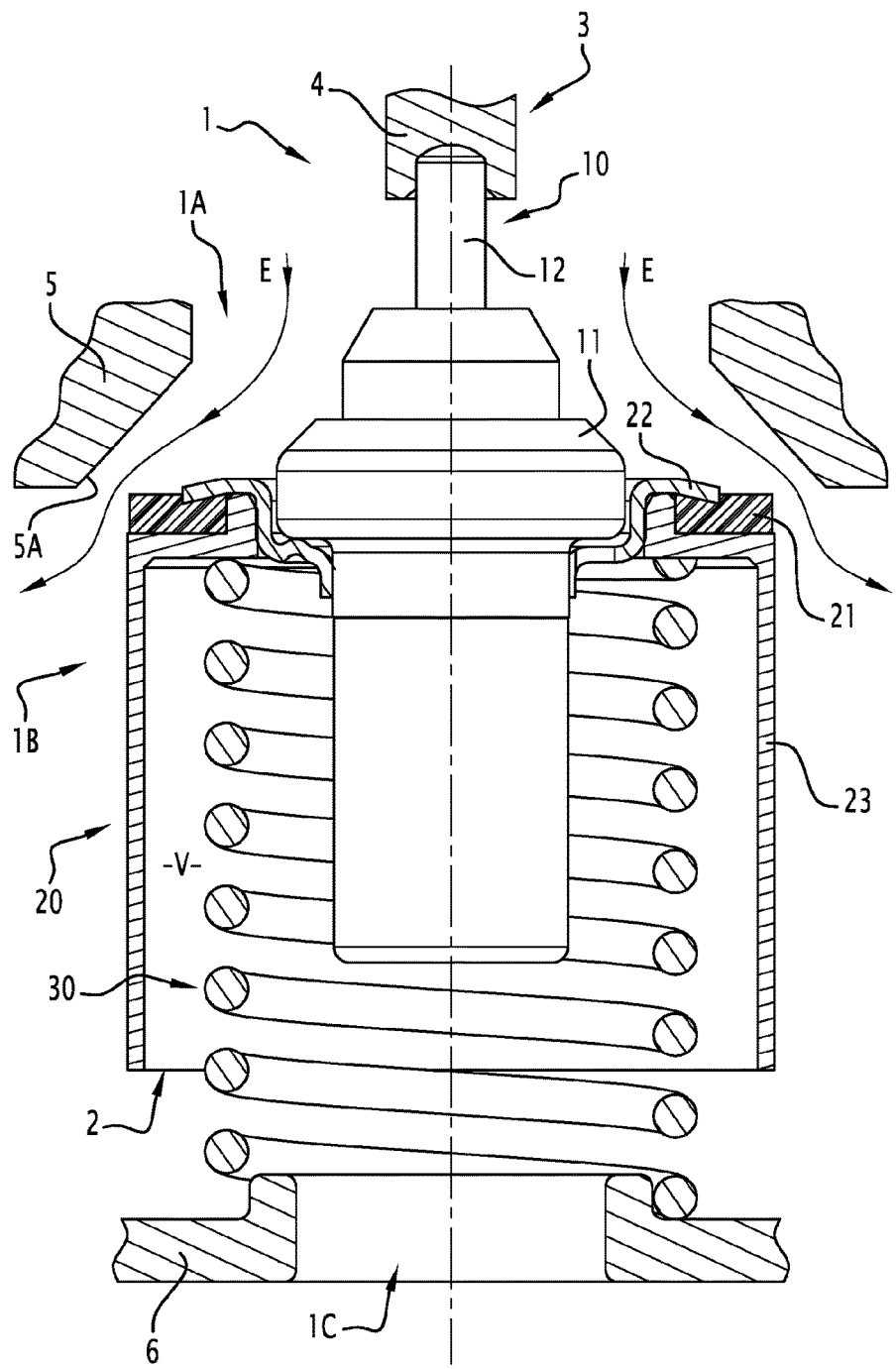
FIG. 2 is a view similar to FIG. 1, showing the valve in a different operating configuration.
Figure 3:
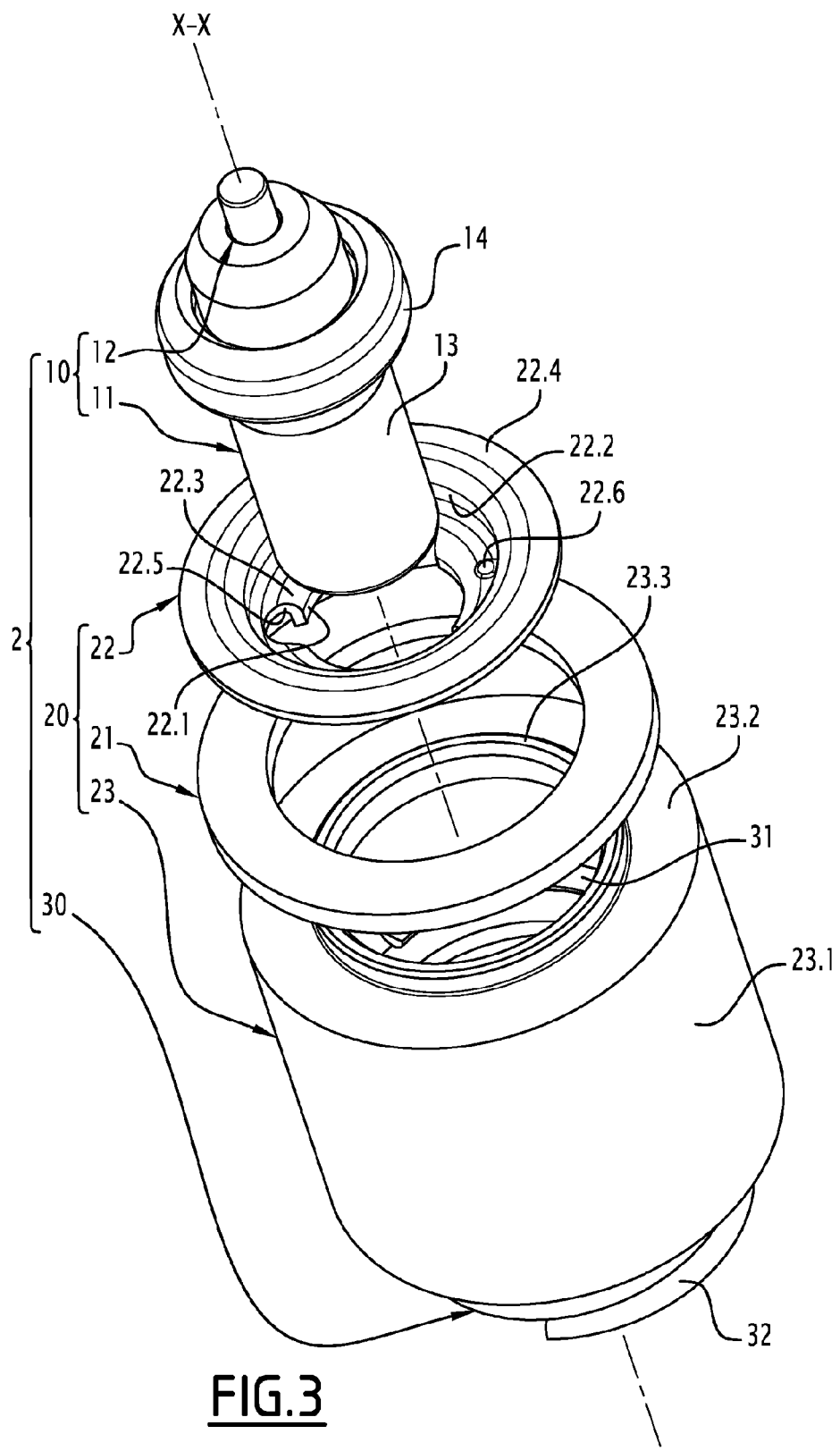
FIG. 3 is an exploded perspective view of a thermostatic device belonging to the valve of FIG. 1.

The thermostatic device 2 is shown alone in FIG. 3, while in FIGS. 1 and 2, this device 2 is arranged in parts 4, 5 and 6 of a housing 3 of the valve 1, having noted that these parts 4, 5 and 6 are fixed relative to one another, while for example being integral with and/or fixedly secured to one another, when the valve 1 is in use as shown in FIGS. 1 and 2. In practice, in FIGS. 1 and 2, the parts 4, 5 and 6 of the housing 3 are shown only partially and schematically, their embodiment not being limiting with respect to the invention. In all cases, when the valve 1 is in use, the housing 3 channels the fluid by defining at least two flow pathways 1A and 1B for the fluid: one of these pathways constitutes a fluid inlet while the other constitutes a fluid outlet. In the embodiment considered in FIGS. 1 and 2, the housing defines a third fluid flow pathway 1C, which may either be a fluid inlet or a fluid outlet for the valve 1. As an example, when the valve 1 belongs to a secondary circuit of a cooling assembly, the pathway 1A constitutes a fluid inlet, coming from an exchanger provided to lower the temperature of the fluid traversing it, while on the one hand, the pathway 1B constitutes an outlet for this fluid, for example sending the latter to a thermal unit of the secondary circuit, and on the other hand, the pathway 1C constitutes a fluid inlet, supplied by fluid not having passed through the aforementioned heat exchanger and for example coming directly from the aforementioned thermal unit. In this example, it will be understood that, during use, the fluid supplying the valve 1 by its pathway 1A is provided to be colder than the fluid supplying the valve by its pathway 1C, the fluid leaving the valve 1 by its pathway 1B having a temperature that is comprised between those of the two fluid inlets and the value of which results from the fluid flow rates actually allowed inside the valve by these two inlets, respectively.

The thermostatic device 2 includes a thermostatic element 10 that is centered on a geometric axis X-X. This thermostatic element 10 includes a body 11, centered on the axis X-X and containing a thermodilatable material such as a wax. The thermostatic element 10 also comprises a piston 12, the longitudinal geometric axis of which is aligned on the axis X-X within the device 2 and a terminal axial part of which is submerged in the thermodilatable material contained in the body 11. The body 11 and the piston 12 are translatable relative to one another along the axis X-X: under the effect of the expansion of the thermodilatable material, the piston 12 deploys outside the body 11, while, during a contraction of the thermodilatable material, the piston is retractable inside the body 11 under the effect of a return spring 30 described later.

Within the valve 1 when the latter is in use, the piston 12 of the thermostatic element 10 is securely fastened to the housing 3. More specifically, in a manner known in itself, the terminal part of this piston 12, opposite that submerged in the body 11, is securely fastened to the part 4 of the housing 3 arranged across the axis X-X. In practice, various embodiments can be considered regarding the secure fastening of the aforementioned terminal part of the piston 12 to the part 4 of the housing 3: this secure fastening can be done either solely by axial bearing, or by removable fastening, of the clipping or sliding fitting type, or by permanent securing of the forced fitting type, overmolding, or addition of a mechanical maintaining system. In all cases, it will be understood that, when the thermodilatable material of the body 11 of the thermostatic element 10 expands or contracts, the piston 12 is kept immobile relative to the housing 3, due to the secure fastening of its aforementioned terminal part to the part 4 of this housing.

The thermostatic device 2 also comprises a stopper 20 that is movable along the axis X-X relative to a fixed seat 5A of the part 5 of the housing 3, so as to open and close a corresponding fluid flow path, defined between the seat and the seal: within the valve 1 during use, when the stopper 20 is pressed against the seat 5A like in the operating configuration shown in FIG. 1, this stopper closes the aforementioned passage and therefore prevents the fluid from flowing between the paths 1A and 1B, whereas, when the stopper 20 is separated from the seat 5A as in the operating configurations shown in FIG. 2, the stopper 20 opens the aforementioned passage and therefore allows fluid to flow between the paths 1A and 1B as indicated by the arrows E in FIG. 2. The stopper 20 is therefore comparable to a gate.

To control the movement of the stopper 20, the latter is securely fastened to the body 11 of the thermostatic element 10 such that, within the valve 1 when it is in use, the axial movement of the body 11 relative to the housing 3, resulting from the expansion of the thermodilatable material, causes a corresponding movement of the stopper 20 so as to open the aforementioned passage, by axial separation of this stopper 20 with respect to the fixed seat 5A.

For convenience, the rest of the description is oriented relative to the axis X-X, such that the adjective "inner" describes an element facing toward the axis X-X, while the adjective "outer" describes an element facing away from the axis X-X. Likewise, the terms "upper", "top" and similar terms describe an element which, in the direction of the axis X-X, faces the top of FIGS. 1 to 4 and 6, while the terms "lower", "bottom" and similar terms describe an element facing the opposite direction. Thus, in the example considered here, the piston 12 is arranged above the body 11, its terminal part, submerged in the body 11, being its lower terminal part, while its terminal part fixedly connected to the part 4 of the housing 3 is its upper terminal part.

As clearly shown in FIGS. 3 to 6, the stopper 20 comprises, as piece separate from the rest of the stopper, a seal 21. This seal 21 is made from elastomer or rubber, or more generally, a flexible material compared to the rest of the stopper 20, such that the seal 21 is designed, when the stopper 20 closes the aforementioned fluid flow passage like in FIG. 1, to be pressed flexibly, or even elastically, against the seat 5A of the part of the housing 3 and thus to seal the contact between this seat and the stopper. Thus, the seal 21 can be described as a sealing gasket for the stopper 20. As an alternative that is not shown, the stopper 20 may have no seal 21, for example in the event a sealing gasket is provided on the seat 5A or in the case where non-sealed contact between the seat and the stopper in the closed position is allowed.

In the embodiment considered in the figures, the seal 21 is a flat seal, which is globally washer-shaped, centered on the axis X-X. This flat washer shape is particularly cost-effective.

The stopper 20 also comprises, as piece separate from the rest of the seal, a metal piece 22, and it includes all of the part of the seal 20 situated, at any axial level, radially closest to the axis X-X, and which, as a result, is subsequently called insert. As clearly shown in FIGS. 3 and 6, the insert 22 has a globally tubular and stepped shape, which is substantially centered on the axis X-X and outside which the rest of the stopper 20 is arranged in full. The insert 22 thus has inner and outer faces, respectively referenced 22A and 22B in FIG. 6.

Figure 6:
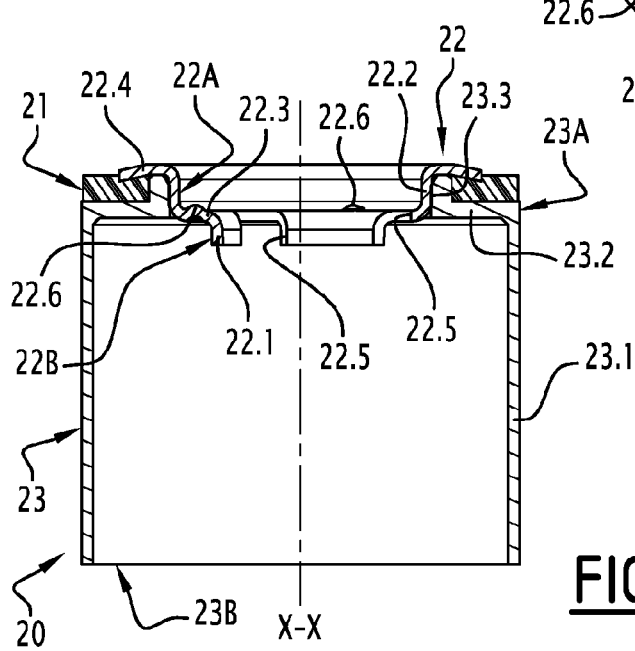
FIG. 6 is a sectional view along line VI-VI FIG. 5.

As clearly shown in FIG. 6, the insert 22 comprises a lower ring 22.1 and an upper ring 22.2, centered on the axis X-X. The lower ring 22.1 has inner and outer diameters are respectively smaller than the inner and outer diameters of the upper ring 22.2, such that the insert 22 includes a shoulder part forming a crown 22.3 that connects the upper end of the lower ring 22.1 to the lower end of the upper ring 22.2, while extending globally in a geometric plane perpendicular to the axis X-X. At its upper end, the upper ring 22.2 is extended by a crown 22.4 protruding radially toward the outside of the upper ring 22.2. This crown 22.4 extends globally in a geometric plane perpendicular to the axis X-X, having noted that, in the example embodiment considered in the figures, the outer peripheral part of the crown 22.4 is slightly inclined downward moving away from the axis X-X.

According to another practical and advantageous embodiment, the insert 22 is made from metal, for example being made from stainless steel. This insert 22, which includes the lower ring 22.1, the crown 22.3, the upper ring 22.2 and the crown 22.4 in a single-piece manner, is in particular made by bending and/or stamping a sheet.

Figure 4:
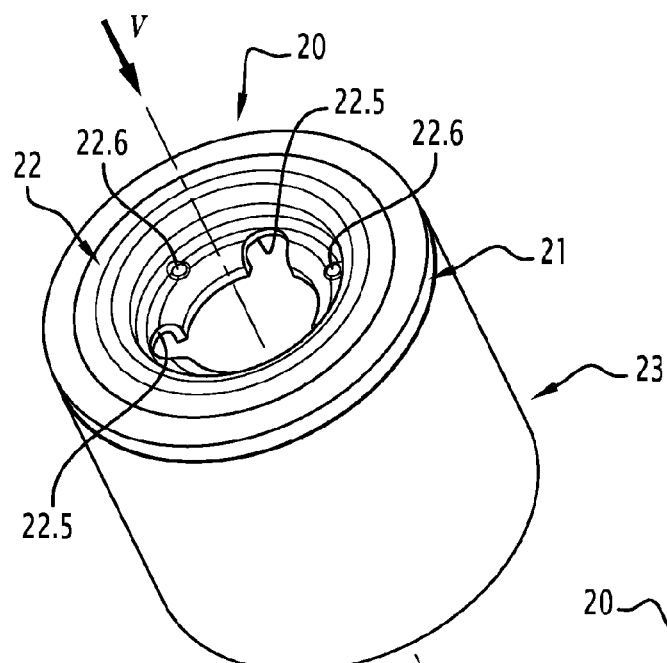
FIG. 4 is a perspective view of a stopper of the thermostatic device of FIG. 3.
Figure 5:
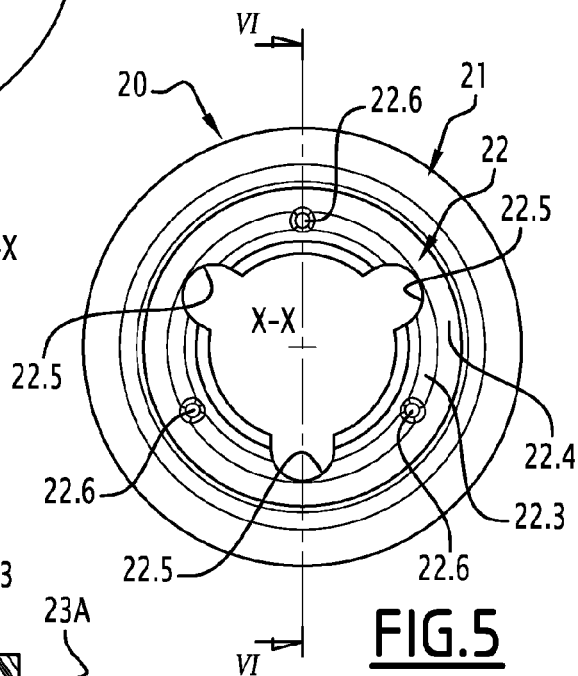
FIG. 5 is an elevation view along arrow V of FIG. 4.

As clearly shown in FIGS. 4 to 6, the crown 22.3 of the insert 22 is axially traversed by holes 22.5. In the example embodiment considered here, these through holes 22.5 are provided in three copies, while being regularly distributed around the axis X-X. According to one practical and advantageous embodiment, each of these through holes 22.5 is made in the form of a notch, hollowed in the crown 22.3 from the lower ring 22.1, which is thus, along its periphery, interrupted at this notch.

Also as clearly shown in FIGS. 4 to 6, the crown 22.3 of the insert 22 is provided, on its upper face, with reliefs 22.6 protruding upward relative to the rest of the crown 22.3. According to one practical and advantageous embodiment, which is implemented in the embodiment considered in the figures, each of these reliefs 22.6 is made in the form of a boss.

As clearly shown in FIGS. 1 and 2, the inner diameter of the lower ring 22.1 of the insert 22 is substantially complementary to the outer diameter of a lower shell 13 of the body 11 and the thermostatic element 10, in which the thermodilatable material is stored, while the inner diameter of the upper ring 22.2 of the insert is at least slightly larger than the outer diameter of an upper peripheral collar 14 of this body 11, which is arranged radially protruding toward the outside of the shell 13: in the assembled state of the thermostatic device 2, the body 11 of the thermostatic element 10 is received in a globally complementary manner in a bore 22C that defines the inner face 22A of the insert 22 at these rings 22.1 and 22.2. More specifically, the upper terminal part of the shell 13 is housed in an adjusted manner in the lower ring 22.1 and the lower terminal part of the collar 14 is housed with radial play in the upper ring 22.2, a shoulder 15 formed at the junction between the shell 13 and the collar 14 being received in downward axial bearing against the crown 22.3 of the insert 22. According to one practical and effective possible embodiment, the fixed connection between the body 11 of the thermostatic element and the insert 22 of the seal 20 is provided fixed and is done by tight fitting of the lower ring 22.1 around the shell 13 of the body 11. Of course, as an alternative that is not shown, other possibilities for producing this fixed connection can be considered. In all cases, more generally, inasmuch as no direct interaction occurs between the body 11 of the thermostatic element 10 and the rest of the seal 20, it will be understood that the insert 22 exclusively provides the connection between the seal and the body of the thermostatic element.

In the assembled state of the thermostatic device 2, which has just been described, it will be understood that, as clearly shown in FIGS. 1 and 2, the reliefs 22.6 of the crown 22.3 of the insert 22 axially upwardly raise the body 11 of the thermostatic element 10, upwardly offsetting the shoulder 15 of this body with respect to the rest of the crown 22.3. In this way, as clearly shown in the right half of FIGS. 1 and 2, the shoulder 15 of the body 11 of the thermostatic element 10 does not rest by sealing bearing against the upward mouths of the holes 22.5 of the crown 22.3, but on the contrary, is upwardly separated from these mouths, thus arranging, between this shoulder 15 and the upper mouth of each of the holes 22.5, non-zero axial play. At the junction between the crown 22.3 and the upper ring 22.2, the aforementioned axial play freely communicates with the radial play defined between the upper ring 22.2 and the collar 14 of the body 11 of the thermostatic element, this radial play emerging freely upward on the outside. It will be understood that the through holes 22.5 and the reliefs 22.6 belong to a leak arrangement with which the insert 22 is provided, in the sense that, in the assembled state of the thermostatic device 2, fluid is free to flow inside the insert 22, more specifically between the body 11 of the thermostatic element 10 and at least part of the inner face 22A of the insert, and to traverse this insert to reach the outer face 22B, as indicated by the arrows after in FIG. 1. In the example embodiment considered here, this fluid leak, called F hereinafter, comes from the pathway 1A and joins, through the stopper 20, the pathway 1B, by flowing first in the radial play between the upper ring 22.2 of the insert 22 and the collar 14 of the body 11 of the thermostatic element 10, then in the axial play, resulting from the reliefs 22.6, between the crown 22.3 of the insert and the shoulder 15 of the body of the thermostatic element, before rejoining the lower face of the crown 22.3 via the transverse holes 22.5.

In practice, irrespective of the embodiment of the aforementioned leak arrangement, the fluid leak F is free to occur irrespective of the axial position of the stopper 20 relative to the housing 3. That being said, the fluid tends to flow through this leak F practically exclusively when the stopper 20 is in the closed position like in FIG. 1, i.e., when the stopper is in contact with the seat 5, since, once the stopper 20 is separated from the seat 5A, the fluid tends to flow, for the large majority thereof or even almost exclusively, through the open passage between the stopper and the seat, as indicated by arrows E in FIG. 2, the flow of the fluid to this passage being significantly less resistant than through the aforementioned leak arrangement.

The stopper 20 further comprises, also as piece separate from the rest of the stopper, a sleeve 23 that is arranged coaxially and around the insert 22. The sleeve 23 has a globally tubular shape, centered on the axis X-X, which, in the assembled state of the thermostatic device 2, surrounds the body 11 of the thermostatic element 10, with, at the axial level of the insert 22, radial interposition of at least part of this insert 22. Thus, the sleeve 23 outwardly jackets the body 11 of the thermostatic element 10.

The sleeve 23 includes a main tube 23.1, which is centered on the axis X-X and which connects the opposite axial ends 23A and 23B of the sleeve to one another. In the example embodiment considered in the figures, this tube 23.1 has a circular base, its inner and outer faces being cylindrical with a circular profile centered on the axis X-X. At the lower end 23B of the sleeve 23, the tube 23.1 is free such that the sleeve emerges freely on the outside along the axis X-X, as clearly shown in FIGS. 1, 2 and 6. At the upper end 23A of the sleeve 23, the tube 23.1 is extended, toward the axis X-X, by an axial closing wall of the sleeve, this closing wall including both a crown 23.2 and a peripheral rim 23.3. In the example embodiment considered in the figures, the crown 23.2 of the sleeve 23 connects the upper end of the tube 23.1 to the lower end of the rim 23.3, while extending globally in a geometric plane perpendicular to the axis X-X, while the rim 23.3 has an annular shape, centered on the axis X-X, extending axially upward from the inner end of the crown 23.2.

Irrespective of the embodiment of the closing wall of the sleeve 23, provided at its upper end 23A, the rim 23.3 of this closing wall is designed to encircle and be fastened to the outer face 22B of the insert 22: according to one cost-effective and strong embodiment, which is further implemented in the example considered in the figures, the rim 23.3 of the sleeve 23 is made subject to the outer face of the upper ring 22.2 of the insert 22, while being fitted tightly around this ring 22.2. The rim 23.3 is advantageously received inside the washer-forming seal 21: the inner peripheral edge 21C of the gasket 21 thus outwardly encircles the rim 23.3, if applicable while being adjusted on the outer diameter of this rim 23.3 for relative wedging reasons, in particular during the assembly of the seal 20. The crown 23.2 of the aforementioned closing wall of the sleeve 23 is in turn designed to participate in the fastening of the seal 21, inasmuch as this seal 21 is axially gripped between the insert 22 and the sleeve 23, more specifically between the crown 22.4 of the insert and the crown 23.2 of the sleeve 23, while applying, at least to the inner part of the seal 21, a gripping stress such that the seal 21 is firmly kept in place.

According to another practical and high-performing embodiment, the sleeve 23 is made from metal, for example being made from stainless steel. The sleeve 23, which includes the main tube 23.1, the crown 23.2 and the rim 23.3 in a single-piece manner, is advantageously made by stamping a sheet or a tubular profile.

In the assembled state of the thermostatic device 2, the main tube 23.1 of the sleeve 23 surrounds, at a distance, the entire outer periphery of the body 11 of the thermostatic element 10. In other words, this tube 23.1 runs all the way around the outer face of the body 11 of the thermostatic element 10, in particular the outer face of the shell 13 of this body 11, and, in the example embodiment considered here, substantially orthoradially to the axis X-X, while maintaining a non-zero radial separation between this outer face of the body 11 and the inner face of the sleeve 23, in particular between the outer face of the shell 13 and the inner face of the main tube 23.1. The sleeve 23 and the body 11 of the thermostatic element thus radially delimit, between them, a free space V, which, in the example considered here, is essentially radially delimited between the shell 11 and the tube 23.1 and has a substantially annular geometric shape, with a circular base and centered on the axis X-X. As clearly shown in FIGS. 1 and 2, the upper end of this free space V is closed by both the crown 23.2 of the sleeve 23 and the crown 22.3 of the insert 22, these two crowns also advantageously being situated substantially at the same level along the axis X-X.

It will be understood that in the presence of the aforementioned fluid leak F, the fluid passing through the aforementioned leak arrangement circulates freely in the free space V, as indicated by the arrows drawn in FIG. 1 inside this space V. Due to the radial separation between the sleeve 3 and the body 11 of the thermostatic element 10 over the entire outer periphery of this body, the fluid flowing in the free space V sweeps the entire outer face of the part of this body 11, arranged inside the sleeve 3, in other words, the entire outer face of the shell 13 for the example embodiment considered in the figures, this fluid being channeled in a corresponding manner by the tube 23.1 of the sleeve 3.

In the aforementioned scenario where the fluid enters the valve 1 through the pathway 1A, the fluid leak F, which flows from top to bottom through the stopper 20, reaches, upon leaving the lower mouth of the through holes 22.5 of the crown 22.3 of the insert 22, the upper end of the free space V, then flows downward along the outer face of the shell 13, until reaching the lower end of the space V where the fluid freely leaves the sleeve 23 axially downwardly, via the lower end 23B of this sleeve. More generally, irrespective of the flow direction of the fluid through the valve 1, it will be understood that the fluid leak, allowed through the insert 22 inwardly receiving the body 11 of the thermostatic element 10 and channeled all around this body 11 by the sleeve 23 outwardly lining this body 11, thermally pre-sensitizes the thermostatic element 10 effectively, in particular when the stopper 20 of the valve 1 is in its closed position, as shown in FIG. 1: when a sudden intake occurs of a fluid stream hotter than that of the leak, for example via the pathway 1C of the valve 1, the temperature increase of the body 11 of the thermostatic element is gentler and the opening of the stopper 20 is more gradual than if this body 11 had not been pre-sensitized by the fluid from the leak.

The aforementioned spring 30 is a compression spring belonging to the thermostatic device 2. Within the valve 1 when the latter is in use, this spring 30 is provided to return the body 11 of the thermostatic element 10 toward the piston 12 of this thermostatic element during a contraction of the thermodilatable material, so as to command the closing of the aforementioned fluid flow passage via the driving, by the body 11, of the stopper 20 with respect to the seat 5A. To that end, the spring 30 is functionally interposed between the body 11 and the piston 12 of the thermostatic element 10 so as to be compressed in the axis X-X when the body 11 and the piston 12 move axially away from one another. More specifically in the embodiment considered here, the spring 30 is physically interposed, in the axis X-X, between the stopper 20 and the part 6 of the housing 3, an upper end turn 31 of the spring 30 being pressed axially against the sleeve 23, in particular against its crown 23.2 while, axially opposite this turn 31, a lower end turn 32 of the spring 30 is pressed axially downward against the part 6 of the housing 3.

Irrespective of their individual embodiments, the insert 22 and the sleeve 23, as well as, if applicable, the seal 21, are preferably assembled to one another independently from the rest of the thermostatic device 2. Thus, independently of the thermostatic element 10 and the compression spring 30, the insert 22 and the sleeve 23 are fastened to one another, if applicable while gripping the seal 21 between them, obtaining the stopper 20 in the assembled state as described above and as shown in FIGS. 4 to 6. Then, this stopper 20, as preassembled subassembly, is assembled to the thermostatic element 10 and the compression spring 30, the obtained thermostatic device 2 being arranged inside the housing 3 to form the valve 1. In this way, it will be understood that the preassembled assembly formed by the stopper 20 is interchangeable within the thermostatic device 2, and therefore within the valve 1. Sleeve other words, by modifying the shape and/or dimension specificities of the seal 22 and/or the insert 23 and/or the seal 21 if applicable, the stopper 20 is easily adaptable to thermostatic elements, compression springs and valve housings, functionally similar to the thermostatic element 10, the compression spring 30 and the housing 3 described thus far, but having different shapes and sizes.

Various arrangements and alternatives to the device 2 and valve 1 described thus far may be considered. As examples:
  rather than the spring 30 being arranged inside the sleeve 23 like in the example embodiment in the figures, the spring can be arranged outside the sleeve, while advantageously bearing axially against it at a crown dedicated to this purpose, for example functionally similar to the crown 23.2; in this case, it will be understood that, compared to the example embodiment considered in the figures, the main tube 23.1 can have a smaller cross-section, such that the tube is housed inside the spring 30, once the inner face of this tube surrounds, at a distance, the entire outer periphery of the body 11 of the thermostatic element 10; and/or rather than being securely connected to the body 11 of the thermostatic element 10, the seal 20 may be mounted on this body 11 with a free movement along the axis X-X, on the condition that it is associated with a dedicated return spring; the seal 20 then incorporates a deballasting function in case of overpressure at the corresponding fluid flow passage; and/or the embodiment of the thermostatic element 10 is not limiting, inasmuch as this element may optionally be controlled, i.e., incorporate a heating electric resistance, or may assume various diameters, etc.; and/or the body 11 of the thermostatic element 10 may, at its lower end, be provided with a downward extension, which movably bears a seal other than the seal 20, in order to command the flow of fluid in the path 1C of the valve 1, thus for example adjusting a bypass function within the circuit to which the valve belongs.

The invention claimed is:

1. A thermostatic device for controlling the flow of a fluid, comprising:

a thermostatic element, which defines an axis and which includes both a piston, extending along the axis and fixedly connected to a housing channeling the fluid, and a body, substantially centered on the axis and containing a thermodilatable material in which the piston is submerged, such that the piston and the body are movable relative to one another along the axis, moving away from one another under the action of an expansion of the thermodilatable material, and a stopper, which is axially movable relative to a fixed seat of the housing so as to open and close a fluid flow passage and which is connected to the body of the thermostatic element such that, during the expansion of the thermodilatable material, the body of the thermostatic element drives the stopper axially relative to the fixed seat, wherein the stopper comprises, as two separate parts:

an insert receiving the body of the thermostatic element, which is provided with a leak arrangement, suitable, irrespective of the axial position of the stopper relative to the housing, for allowing the fluid to flow freely between the body of the thermostatic element and an inner face of the insert and to traverse the insert to reach an outer face of the insert, and a sleeve outwardly jacketing the body of the thermostatic element, which is fixedly attached to the insert while surrounding, at a distance, the entire periphery of the body of the thermostatic element so as to radially delimit, between this body of the thermostatic element and the sleeve, a free space for the flow of the fluid passing through the leak arrangement.

2. The thermostatic device according to claim 1, wherein the insert and the sleeve are made from metal.

3. The thermostatic device according to claim 2, wherein the insert is a bended sheet or a stamped sheet.

4. The thermostatic device according to claim 2, wherein the sleeve is a stamped sheet or a stamped tubular profile.

5. The thermostatic device according to claim 1, wherein the insert comprises a crown axially bearing the body of the thermostatic element, and in that the leak arrangement comprises both at least one through hole of said crown, provided to allow the fluid to flow freely through the crown, and at least one relief of said crown, provided to axially raise the body of the thermostatic element.

6. The thermostatic device according to claim 5, wherein the at least one relief of the crown of the insert is made in the form of a boss.

7. The thermostatic device according to claim 5, wherein the insert further includes, on an inner periphery of its crown, a ring radially adjusted to the body of the thermostatic element, and wherein the at least one through hole of said crown is made in the form of a notch from said ring.

8. The thermostatic device according to claim 1, wherein the sleeve is provided, at one of axial ends of the sleeve, with a peripheral rim to fasten the sleeve to the outer face of the insert.

9. The thermostatic device according to claim 8, wherein the peripheral rim of the sleeve is fitted gripped around the insert.

10. The thermostatic device according to claim 8, wherein the stopper further comprises a seal, which is suitable for being pressed sealably against the fixed seat when the fluid flow passage is closed by the stopper and which is axially gripped between the insert and the sleeve, and wherein the seal is globally washer-shaped, being centered on the axis, and inwardly receives the peripheral rim of the sleeve.

11. The thermostatic device according to claim 1, wherein the stopper further comprises a seal, which is suitable for being pressed sealably against the fixed seat when the fluid flow passage is closed by the stopper and which is axially gripped between the insert and the sleeve.

12. The thermostatic device according to claim 1, wherein the thermostatic device further comprises a compression spring, which, during a contraction of the thermodilatable material of the thermostatic element, returns the piston into the body of the thermostatic element and axially drives the stopper axially relative to the fixed seat, said compression spring including two opposite ends, whereof the first end is pressed axially against the sleeve of the stopper, while the second end of this compression spring is pressed axially against the housing.

13. A thermostatic valve, including a housing and a thermostatic device according to claim 1, the piston of the thermostatic element of the thermostatic device being is fixedly connected to the housing.

* * * * *